(12) United States Patent
Broughton et al.

(10) Patent No.: US 7,619,046 B2
(45) Date of Patent: Nov. 17, 2009

(54) PRODUCTION OF POLYMERS IN A CONICAL REACTOR

(75) Inventors: Simon Broughton, Rochdale (GB); Gareth Ian Naylor, Halifax (GB); Anthony Moran, Bradford (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 84 days.

(21) Appl. No.: 11/918,693

(22) PCT Filed: Apr. 19, 2006

(86) PCT No.: PCT/EP2006/061675
§ 371 (c)(1),
(2), (4) Date: Oct. 17, 2007

(87) PCT Pub. No.: WO2006/117292
PCT Pub. Date: Nov. 9, 2006

(65) Prior Publication Data
US 2009/0076231 A1    Mar. 19, 2009

(30) Foreign Application Priority Data
Apr. 29, 2005    (EP) ................... 05103559

(51) Int. Cl.
*C08F 2/10*    (2006.01)
*B01J 19/24*    (2006.01)
*C08F 120/56*    (2006.01)

(52) U.S. Cl. ............... 526/88; 526/65; 526/918; 526/930; 422/131; 422/134

(58) Field of Classification Search ............... 526/88, 526/918, 930, 65; 422/131, 134
See application file for complete search history.

(56) References Cited

U.S. PATENT DOCUMENTS

| 3,298,792 A | 1/1967 | Di Drusco | 23/284 |
| 3,799,917 A | 3/1974 | Rathke | 260/92.8 |
| 3,873,508 A | 3/1975 | Turner | 260/88.7 |

(Continued)

FOREIGN PATENT DOCUMENTS

| EP | 0 725 084 | 8/1996 |
| GB | 1054028 | 1/1967 |

OTHER PUBLICATIONS

Patent Abstracts of Japan 2000038406 Jul. 1998.

*Primary Examiner*—Fred M Teskin
(74) *Attorney, Agent, or Firm*—Shiela A. Loggins

(57) ABSTRACT

The present invention provides a process for the preparation of polymer which comprises the steps of i) feeding an aqueous mixture comprising a monoethylenically unsaturated monomer or a mixture of monoethylenically unsaturated monomers and an initiator into the top of a reactor ii) polymerizing the monoethylenically unsaturated monomer to form a gel-like aqueous mixture comprising the polymer, iii) squeezing the gel-like aqueous mixture comprising the polymer out of the bottom of the reactor using inert gas, wherein the reactor is either a vertical fully conical reactor having an angle (alpha) between top diameter (d1) of the reactor and inner wall of the reactor of smaller than 90° but larger than 45° or is made up of 2 to 5 connected vertical fully conical parts, which are on top of one another, each having an angle between top diameter of the part and inner wall of the part of smaller than 90° but larger than 45°.

7 Claims, 1 Drawing Sheet

U.S. PATENT DOCUMENTS

| | | | |
|---|---|---|---|
| 4,985,514 A * | 1/1991 | Kimura et al. | 526/88 |
| 5,633,329 A | 5/1997 | Hähnle et al. | 526/64 |
| 6,441,108 B1 * | 8/2002 | Haendeler et al. | 526/64 |
| 2004/0092688 A1 * | 5/2004 | Dairoku et al. | 526/317.1 |
| 2004/0110897 A1 * | 6/2004 | Sakamoto et al. | 524/832 |
| 2005/0014922 A1 * | 1/2005 | Muller et al. | 528/271 |

\* cited by examiner

Fig. 1: Fully conical reactor
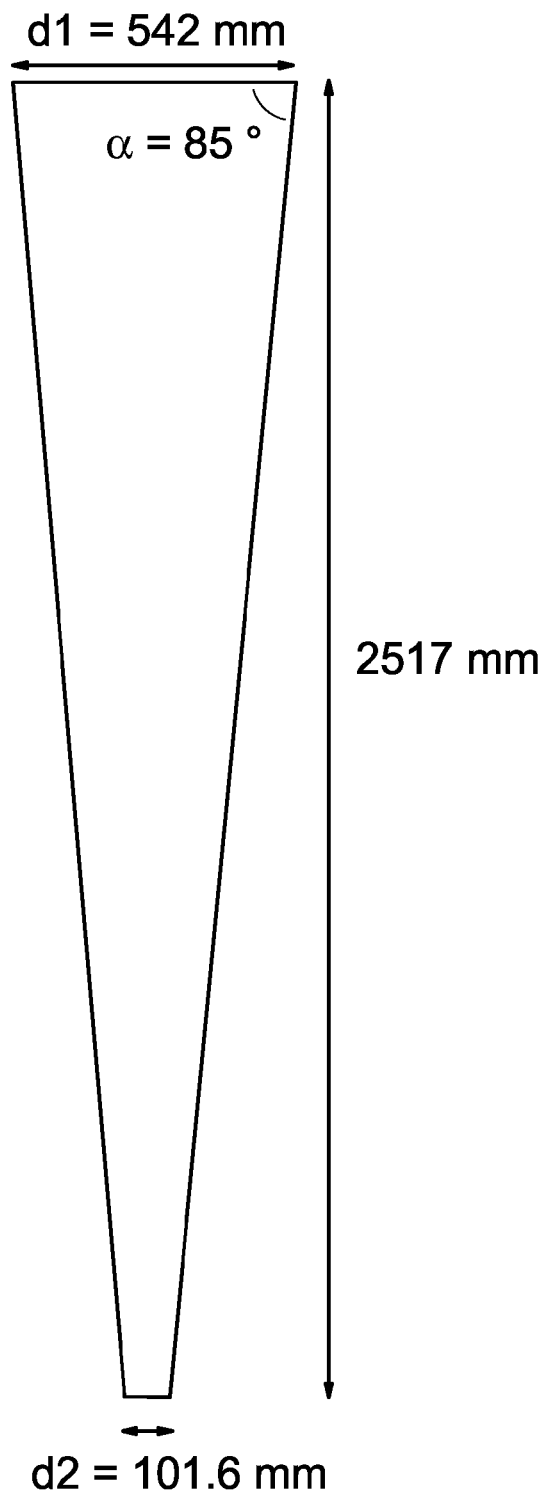

PRODUCTION OF POLYMERS IN A CONICAL REACTOR

The present invention refers to a process for preparing polymers, a reactor and to polymers produced by the process of the present invention.

GB 1,054,028 describes a process for the batch-wise preparation of water-soluble polymers, which comprises polymerizing a monomer in an aqueous medium to form a viscous solution comprising the polymer and squeezing the viscous solution out of the reactor by using a close fit partition. The reactor is either a vertical or horizontal tube. If it is a vertical tube it has a conically shaped bottom part. The disadvantage of this reactor is that it does not allow a continuous preparation of polymer.

EP 0 725 084 A1 describes a process for preparing polymers which comprises polymerizing monomers in an aqueous medium to form a gel-like mixture comprising the polymer and squeezing the gel-like mixture out of the bottom of the reactor by using inert gas. The reactor used for the polymerization consists of a top part, which is a vertical tube, and a bottom part, which is of conical shape.

The disadvantage of this reactor is that some monomer comes down the inner walls of the reactor as a solution in the aqueous medium and has a much reduced time to polymerize thus allowing some unreacted monomer to leave the reactor together with the polymer. This causes operational problems, because the solution of unreacted monomer in the aqueous medium acts as a lubricant and changes the amount of top pressure needed to control the rate of extrusion of the gel-like mixture comprising the polymer. In addition, the obtained polymer is contaminated with unreacted monomer and the presence of larger amounts of unreacted monomer can lead to further processing problems when granulating and drying the polymer.

If a polymer of low unreacted monomer content is needed, the unreacted monomer has to be removed in an additional step, for example by treatment with further initiator. However, polymers containing a larger amount of initiator are prone to degradation over time and thus are not favoured.

It is an object of the present invention to provide a process, which allows the continuous preparation of polymer having a low content of unreacted monomer, and to provide polymers of low unreacted monomer content.

This object is solved by the process of claim 1 and, by the reactor of claim 7.

FIG. 1 shows a fully conical reactor.

The process of the present invention for the preparation of polymer comprises the steps of
i) feeding an aqueous mixture comprising a monoethylenically unsaturated monomer or a mixture of monoethylenically unsaturated monomers and an initiator into the top of a reactor
ii) polymerizing the monoethylenically unsaturated monomer to form a gel-like aqueous mixture comprising the polymer,
iii) squeezing the gel-like aqueous mixture comprising the polymer out of the bottom of the reactor using inert gas, wherein the reactor is either a vertical fully conical reactor having an angle ($\alpha$) between top diameter (d1) of the reactor and inner wall of the reactor of smaller than 90° but larger than 45° or is made up of 2 to 5 connected vertical fully conical parts, which are on top of one another, each having an angle between top diameter of the part and inner wall of the part of smaller than 90° but larger than 45°.

The reactor does not have any tubular sections.

Preferably, the reactor is either a vertical fully conical reactor having an angle ($\alpha$) between top diameter (d1) of the reactor and inner wall of the reactor of smaller than 90° but larger than 45° or is made up of 2 to 3 connected vertical fully conical parts, which are on top of one another, each having an angle between top diameter of the part and inner wall of the part of smaller than 90° but larger than 45°.

More preferably, the reactor is either a vertical fully conical reactor having an angle ($\alpha$) between top diameter (d1) of the reactor and inner wall of the reactor of smaller than 90° but larger than 45° or is made up of 2 connected vertical fully conical parts, which are on top of one another, each having an angle between top diameter of the part and inner wall of the part of smaller than 90° but larger than 45°.

Most preferably, the reactor is a vertical fully conical reactor having an angle ($\alpha$) between top diameter (d1) of the reactor and inner wall of the reactor of smaller than 90° but larger than 45°.

Preferably, the angle is smaller than 90°, but larger than 60°. More preferably, the angle is smaller than 90°, but larger than 70°. Even more preferably, the angle is smaller than 90°, but larger than 80°. Most preferably, it is smaller than 87° and larger than 83°.

The ratio of top diameter (d1) to bottom diameter (d2) of the reactor can be from 1.1/1 to 24/1. Preferably, it is from 2/1 to 10/1. More preferably, it is from 3/1 to 8/1. Most preferably, it is from 5/1 to 6/1.

When the reactor is made up of 2 to 5 connected vertical fully conical parts, the vertical fully conical parts can be the same or different. The ratio of top diameter to bottom diameter of one of the vertical conical parts can be from 1.1/1 to 24/1. Preferably, it is from 1.1/1 to 10/1. More preferably, it is from 1.2/1 to 5/1. Most preferably, it is from 1.5/1 to 3/1.

The reactor can be made of any suitable material, for example steel, mild steel or glass fibre reinforced plastic. The inner wall of the reactor is coated with an anti-adhesive coating such as polytetrafluoroethylene (PTFE), perfluoroalkoxy copolymer (PFA) or fluoro ethylene propylene (FEP). The reactor has at least one gas inlet and at least one inlet for feeding the monomer and initiator at the top of the reactor and at least one outlet at the bottom of the reactor to remove the polymer. The reactor can be sealed pressure-tight. The reactor can have a cooling/heating device and a stirring device, but preferably the reactor has no such devices.

The monoethylenically unsaturated monomers can be water-soluble or water-insoluble monoethylenically unsaturated monomers.

Water-soluble monoethylenically unsaturated monomers can be carboxylic acids of formula

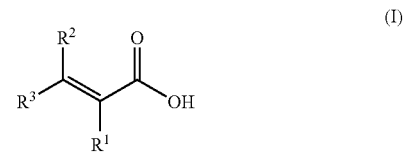

(I)

or salts thereof, in which $R^1$, $R^2$ and $R^3$ are the same or different and are hydrogen, $C_{1\text{-}2}$-alkyl, carboxy or $C_{1\text{-}2}$-alkyl substituted with carboxy,

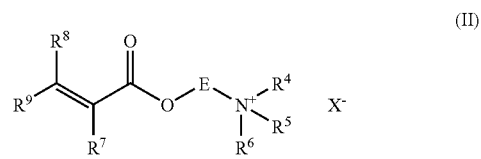

(II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion, amides of formulae

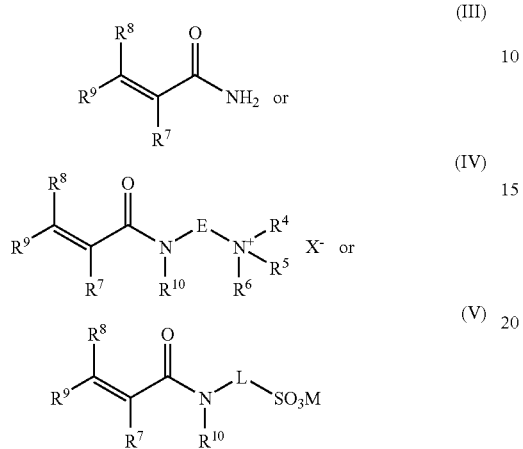

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation, vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium or alkali metal salts thereof. Examples of alkali metals are sodium and potassium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethyl-methacrylate methyl chloride quaternary salt.

Examples of amides of formulae II, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methyl-1-propene sulfonic acid.

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble monoethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble monoethylenically unsaturated monomers are methyl acrylate, ethyl acrylate, butyl acrylate, 2-ethyl hexyl acrylate, stearyl acrylate, methyl methacrylate and stearyl methacrylate.

Preferably the monoethylenically unsaturated monomers are water-soluble.

More preferred monoethylenically unsaturated monomers are water-soluble and are selected from the group consisting of carboxylic acids of formula

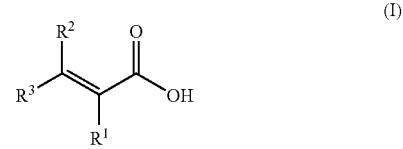

or salts thereof, in which $R^1$, $R^2$ and $R^3$ are the same or different and are hydrogen or methyl, carboxy or methyl substituted with carboxy, esters of formula

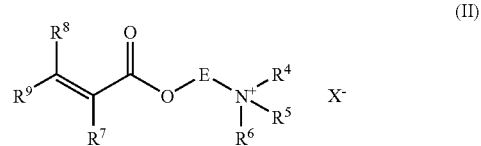

wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion, amides of formulae

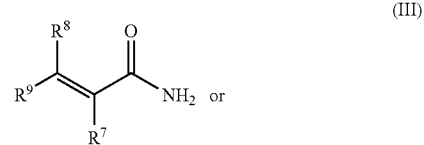

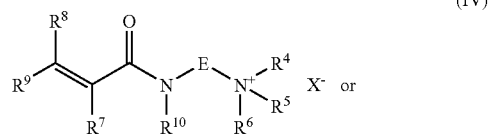

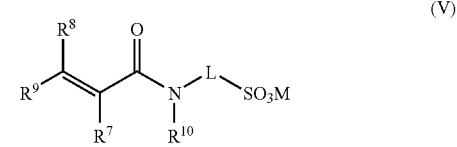

wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation.

Examples of $C_{2-3}$-alkylene are ethylene, trimethylene and propylene. Examples of $C_{1-3}$-alkyl are methyl, ethyl, propyl and isopropyl.

Even more preferred monoethylenically unsaturated monomers are water-soluble and are selected from the group consisting of carboxylic acids of formula

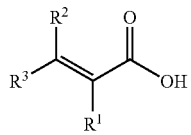
(I)

or salts thereof, in which $R^1$ is hydrogen or methyl and $R^2$ and $R^3$ are both hydrogen, esters of formula

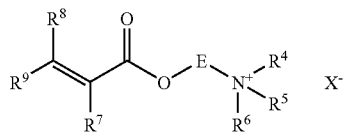
(II)

wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkyl-sulfate, amides of formulae

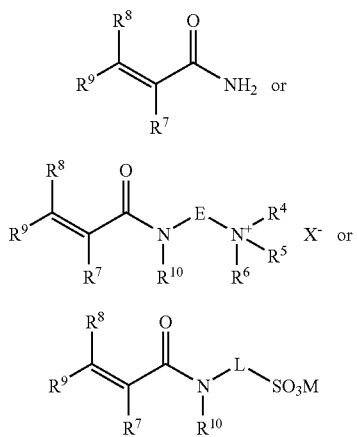
(III)
(IV)
(V)

wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal.

Most preferred monoethylenically unsaturated monomers are water-soluble and are selected from the group consisting of acrylic acid or salts thereof, esters of formula

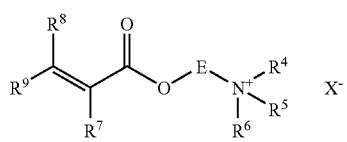
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, acrylamide and amides of formula

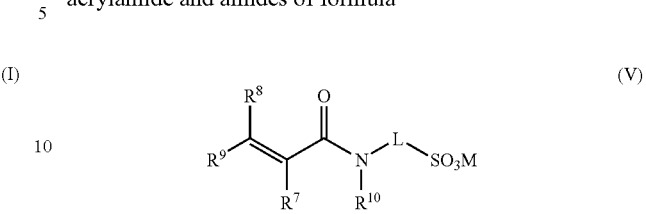
(V)

wherein $R^7$, $R^8$, $R^9$ have the meaning as indicated above, L is $C_{2-4}$-alkylene, $R^{10}$ is hydrogen, and M is hydrogen, ammonium or an alkali metal.

Examples of $C_{2-4}$-alkylene are ethylene, trimethylene, propylene, 2-methylpropylene, tetramethylene and ethylethylene.

Even most preferred the monoethylenically unsaturated monomer is water-soluble and is either acrylamide or a mixture of acrylamide with water-soluble monomethylenically unsaturated monomer selected from the group consisting of acrylic acid or salts thereof, and esters of formula

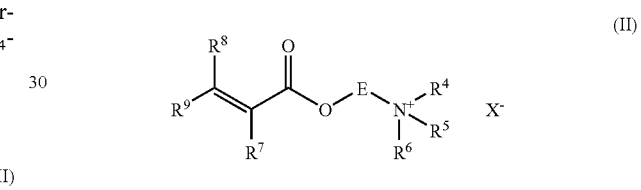
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, and esters of formula

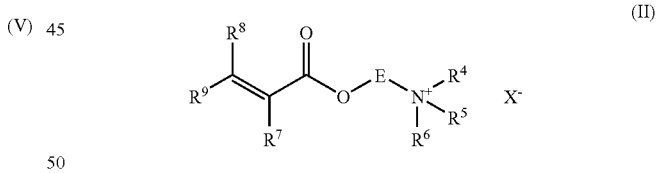
(II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, is at least 30% by weight based on the weight of the monomer mixture.

Depending on the monoethylenically unsaturated monomer or monomer mixture used, the polymers produced by the process of the present invention can be anionic, cationic or non-ionic.

Any suitable initiator can be used. The initiator can be, for example, a peroxide, a persulfate, an azo compound, a sulfate, a redox couple or mixtures thereof.

Examples of peroxides are hydrogen peroxide, potassium peroxide, tert-butyl peroxide, tert-butyl hydroperoxide, cumene hydroperoxide and benzoyl peroxide. Examples of per-sulfates are ammonium, sodium or potassium persulfate. Examples of azo compounds are 2,2-azobisisobutyronitrile, 4,4'-azobis(4-cyanovaleric acid) and 2,2'-azobis(N,N'-dimethyl-eneisobutyramidine) dihydrochloride, 1,1'-azobis(cyclohexanecarbonitrile) and 2,2'-azo-bis(2-amidinopropane) dihydrochloride. Examples of sulfates are ferrous ammonium sulfate and ammonium sulfate. Redox couples consist of an oxidizing agent and a reducing agent. The oxidizing agent can be one of the above listed peroxides, persulfates, sulfates or azo compounds, or an alkali metal chlorate or bromate. Examples of alkali metals are given above. Examples of reducing agents are ascorbic acid, glucose or ammonium or alkali metal hydrogen sulfite, sulfite, thiosulfate or sulfide, or ferrous ammonium sulfate.

Preferably, the initiator is a mixture of a redox couple with one or more initiators selected from the group consisting of peroxides, persulfates and azo compounds.

More preferably, the initiator is a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more preferably, the initiator is a mixture of a redox couple, wherein the oxidizing agent is selected from the group consisting of hydrogen peroxides and alkali metal bromates, and the reducing agent is an alkali metal hydrogen sulfite or sulfite, with one or more azo compound initiators.

Most preferably, the initiator is a mixture of a redox couple, wherein the oxidizing agent is selected from the group consisting of tert-butylhydroperoxide and potassium bromate, and the reducing agent is sodium sulfite, with one or more azo compound initiators selected from the group consisting of 2,2-azobisisobutyronitrile, 4,4'-azobis(4-cyanovaleric acid) and 2,2'-azobis(N,N'-dimethyleneisobutyramidine).

The aqueous mixture comprising the monoethylenically unsaturated monomer or monomer mixture and an initiator can be a solution, dispersion or a suspension of the monomers and the initiator in water or buffer. Preferably, it is a solution of the monomers and initiator in water.

The aqueous mixture comprising the monomers and initiator may also contain additives such as urea, sequesterant agents, organic acids, chain transfer reagents and cross-linking agents.

Examples of sequesterant agents are diethylenetriaminepentaacetic acid, penta sodium salt, and diethylenediaminetetraacetic acid, tetra sodium salt.

Examples of organic acids are adipic acid, citric acid, oxalic acid, tartaric acid, malic acid and benzoic acid.

Examples of chain transfer reagents are thioglycolic acid, sodium hypophosphite, 2-mer-captoethanol, N-dodecyl mercaptan and tert-dodecyl mercaptan.

Examples of cross-linking agents are polyethylenically unsaturated monomer such as N,N'-monomethylenebisacrylamide, poly(ethylene glycol) diacrylate, tetra allyl ammonium chloride and di allyl phthalate.

Preferably, the aqueous medium also contains urea, a sequesterant agent and/or an organic acid. More preferably, the aqueous medium also contains urea, diethylenetriaminepentaacetic acid, penta sodium salt and/or an adipic acid.

If the polymer produced by the process of the present invention is cationic, the aqueous medium most preferably also contains diethylenetriaminepentaacetic acid, penta sodium salt and adipic acid. If the polymer produced is anionic the aqueous medium most preferably also contains diethylenetriaminepentaacetic acid, penta sodium salt and urea. If the polymer produced is non-ionic, the aqueous medium most preferably also contains diethylene-triaminepentaacetic acid, penta sodium salt, urea and adipic acid.

Preferably, the amount of the monoethylenically unsaturated monomer or monomer mixture in the aqueous mixture is between 5 and 60% by weight based on the weight of the aqueous mixture fed into the top of the reactor. More preferably, it is 10 to 50% by weight based on the weight of the aqueous mixture. Even more preferably, it is 25 to 40% by weight based on the weight of the aqueous mixture. Most preferably, it is 28 to 35% by weight based on the weight of the aqueous mixture.

Preferably, the total amount of initiator in the aqueous mixture is between 0.001 to 5% by weight based on the weight of the monomer or monomer mixture. More preferably, it is 0.005 to 2% by weight based on the weight of the monomer or monomer mixture. Most preferably, it is 0.05 to 1% by weight based on the weight of the monomer or monomer mixture. If the initiator is an initiator mixture comprising a redox couple, the amount of oxidizing agent is preferably from 0.0001 to 1%, more preferably from 0.0002 to 0.01%, by weight based on the weight of the monomer, and the ratio of reducing agent to oxidizing agent is from 3/1 to 1/4, preferably from 2.5/1 to 1/3.

Preferably the amount of additives is between 0.0001 to 20% by weight based on the weight of the monomer. More preferably, it is from 0.001 to 15% by weight based on the weight of the monomer.

The aqueous mixture comprising monomer or monomer mixture and the initiator can be prepared by vigorously mixing an aqueous solution of the monomer or monomer mixture with an aqueous solution of initiator shortly before feeding the resulting solution to the top of the reactor. Preferably, the aqueous solution of ethylenically unsaturated monomers is degassed before being mixed with the initiator solution.

Preferably, the aqueous mixture comprising the monomer or monomer mixture and the initiator can be prepared by vigorously mixing an aqueous solution containing the monomer or monomer mixture, one or more azo compound initiators and additives such as urea, organic acids or sequesterant agents with an aqueous solution containing a redox couple initiator and optionally additional azo compound initiator shortly before feeding the resulting solution to the top of the reactor.

Preferably, the aqueous mixture comprising the monomer and the initiator is cooled below 25° C., before being fed into the top of the reactor. More preferably, it is cooled to 10° C. Even more preferably, it is cooled to 0° C. Most preferably, it is cooled to −5° C.

Preferably, the aqueous mixture comprising monomer and initiator is fed into the reactor at a speed that allows a residence time of about 2 to 6 hours. The residence time depends on the monomer used and can be adjusted by a person skilled in the art. Generally, cationic monomers require longer residence times than anionic monomers.

Preferably, the polymerization is performed in the absence of oxygen and in the presence of an inert gas such as nitrogen. Preferably, the inert gas pressure during the polymerization is between 1 and 10 bar, more preferably, between 1 and 5 bar, and most preferably, between 1 and 3 bar. The temperature of the reaction mixture can increase up to 100° C. during polymerization. Preferably, the temperature of the reaction mixture is between 85 and 95° C. during polymerization. The temperature can be controlled by a heating and cooling device, but it is preferably controlled by the amounts of monomer and initiator in the aqueous medium fed into the top of the reactor. The polymerization yields a polymer, which forms a gel-like mixture in the aqueous medium. The resulting polymer usually contains between 1 and $10^8$ monomer units and is either water-soluble or water-insoluble. It can be water-swellable or non-water-swellable.

As soon as the polymer forms a gel-like mixture at the bottom of the reactor, the bottom outlet can be opened and the reaction mixture can be squeezed out from the bottom of the reactor using inert gas such as nitrogen. Preferably, the inert gas pressure applied is between 1 and 10 bar, more preferably, between 1 and 5 bar, and most preferably, between 1 and 3 bar.

Preferably, the content of unreacted monomer in the polymer obtained is below 0.15% by weight based on the weight of the polymer. More preferably, it is below 0.1% by weight based on the weight of the polymer. Most preferably, it is below 0.01% by weight based on the weight of the polymer.

The obtained gel-like mixture comprising the polymer can be granulated and dried in a conventional granulating and drying apparatus to yield polymer having a water content of below 12% by weight.

The process can be performed in a batch or continuous mode. Preferably, it is performed in a continuous mode.

The polymer produced by the process can be used to flocculate solid particulates in water to aid water purification in industries ranging from mining to sewage treatment, bind paper fibres during the paper manufacturing process and coagulate metal ore particulates to enhance metal extraction.

Also part of the invention is the reactor, which is adopted for the process of the present invention. Details regarding the reactor are explained above.

Also part of the invention is polymer produced by the process of the present invention.

The advantage of the process of the present invention is that the reactor can run continuously without significant pressure changes producing polymer with a low content of unreacted monomer. Thus, the problems of previous processes, namely inconvenient control of the pressure during the reaction, contamination of the dryer with unreacted monomer and post-treatment of the polymer to reduce the amount of unreacted monomer, are avoided.

EXAMPLES

Example 1

250 kg of an aqueous mixture is prepared comprising acrylamide, dimethylaminoethyl-acrylate methyl chloride quaternary ammonium salt and adipic acid in a weight ratio of 75/23/3. The mixture also contains 400 ppm of 2,2-azobi-sisobutyronitrile and 300 ppm of diethylenetriaminepentaacetic acid, penta sodium salt, both based on the weight of the aqueous mixture. The mixture has a total dissolved solids concentration of 34%. The mixture is cooled to −1° C. and nitrogen gas is passed through the aqueous medium in order to remove dissolved oxygen. 7 ppm of potassium bromate and 14 ppm of sodium sulfite, both based on the weight of the aqueous mixture, are added one after the other to the aqueous mixture and mixed thoroughly. The obtained aqueous mixture is fed into the top of a fully conical reactor (volume: 200 L, angle: 85°) at a speed of about 50 kg/h. After a residence time of about 4 hours in the reactor, the bottom valve is opened and a top pressure of nitrogen gas is applied to squeeze the gel-like reaction mixture out of the bottom. The pressure is adjusted so that the mass of the material going out of the bottom of the reactor equals the mass of monomer going in at the top. The polymer is found to have a residual acrylamide content of below 1000 ppm.

Example 2

250 kg of aqueous monomer mixture is prepared comprising acrylamide, sodium acrylate and urea in a weight ratio of 63/27/10. The mixture also contains 400 ppm of 2,2-azobi-siso-butyronitrile, 100 ppm of 4,4'-azobis(4-cyanovaleric acid) and 300 ppm of diethylenetriamine-pentaacetic acid, penta sodium salt, all based on the weight of the aqueous mixture. The mixture has a total dissolved solids concentration of 32%. The mixture is cooled to −1° C. and nitrogen gas is passed through the aqueous medium in order to remove dissolved oxygen or other volatile reactive species. 4 ppm of tert-butylhydroperoxide and 8 ppm of sodium sulfite, both based on the weight of the aqueous mixture, are added one after the other to the aqueous mixture and mixed thoroughly. The obtained aqueous mixture is fed into the top of a fully conical reactor (volume: 200 L, angle: 85°) at a speed of about 50 kg/h. After a residence time of about 4 hours in the reactor, the bottom valve is opened and a top pressure of nitrogen gas is applied to squeeze the gel-like reaction mixture out of the bottom. The pressure is adjusted so that the mass of the material going out of the bottom of the reactor equals the mass of monomer going in at the top. The polymer is found to have a residual acrylamide content of below 1000 ppm.

Example 3

250 kg of aqueous monomer mixture is prepared comprising acrylamide, urea and adipic acid in a weight ratio of 98/1/1. The mixture also contains 400 ppm of 2,2-azobi-sisobutyro-nitrile, 400 ppm of 4,4'-azobis(4-cyanovaleric acid) and 300 ppm of diethylenetriamine-pentaacetic acid, penta sodium salt, all based on the weight of the aqueous mixture. The mixture has a total dissolved solids concentration of 31%. The mixture is cooled to −1° C. and nitrogen gas is passed through the aqueous medium in order to remove dissolved oxygen. 10 ppm of potassium bromate, 4 ppm of sodium sulfite and 50 ppm of 2,2'-azobis(N,N'-di-methyleneisobutyramidine) dihydrochloride, all based on the weight of the aqueous mixture, are added one after the other to the aqueous mixture and mixed thoroughly. The obtained aqueous mixture is fed into the top of a fully conical reactor (volume: 200 L, angle: 85°) at a speed of about 50 kg/h. After a residence time of about 4 hours in the reactor, the bottom valve is opened and a top pressure of nitrogen gas is applied to squeeze the gel-like reaction mixture out of the bottom. The pressure is adjusted so that the mass of the material going out of the bottom of the reactor equals the mass of monomer going in at the top. The polymer is found to have a residual acrylamide content of below 1000 ppm.

The invention claimed is:

1. A process for the preparation of polymer comprising the steps of
   i) feeding an aqueous mixture comprising a monoethylenically unsaturated monomer or a mixture of monoethylenically unsaturated monomers and an initiator into the top of a reactor
   ii) polymerizing the monoethylenically unsaturated monomer to form a gel-like aqueous mixture comprising the polymer,
   iii) squeezing the gel-like aqueous mixture comprising the polymer out of the bottom of the reactor using inert gas,
   wherein the reactor is either a vertical fully conical reactor having an angle ($\alpha$) between top diameter (d1) of the reactor and inner wall of the reactor of smaller than 90° but larger than 45° or is made up of 2 to 5 connected vertical fully conical parts, which are on top of one another, each having an angle between top diameter of the part and inner wall of the part of smaller than 90° but larger than 45°.

2. The process of claim 1 wherein the angle of the reactor is smaller than 90°, but larger than 60°.

3. The process of claim 1, wherein the ratio of top diameter to bottom diameter of the reactor is from 1.1/1 to 24/1.

4. The process of claim 1 wherein the monoethylenically unsaturated monomers are water-soluble monoethylenically unsaturated monomers.

5. The process of claim 1 wherein the amount of the monoethylenically unsaturated monomer or monomer mixture in the aqueous mixture is between 5 and 60% by weight based on the weight of the aqueous mixture fed into the top of the reactor.

6. The process of claim 1 wherein the process is performed in a continuous mode.

7. A reactor that is either a vertical fully conical reactor having an angle ($\alpha$) between top diameter (d1) of the reactor and inner wall of the reactor of smaller than 90° but larger than 45° or is made up of 2 to 5 connected vertical fully conical parts, which are on top of one another, each having an angle between top diameter of the part and inner wall of the part of smaller than 90° but larger than 45° in which the reactor has no stirring device.

* * * * *